(12) United States Patent
Marks et al.

(10) Patent No.: US 11,551,509 B2
(45) Date of Patent: Jan. 10, 2023

(54) SYSTEM AND METHOD FOR A HOLD AND SPIN GAME WITH BUILD A BONUS

(71) Applicant: Aristocrat Technologies, Inc., Las Vegas, NV (US)

(72) Inventors: Daniel Marks, Decatur, GA (US); Hua Xu, Marietta, GA (US)

(73) Assignee: ARISTOCRAT TECHNOLOGIES, INC., Las Vegas, NV (US)

( * ) Notice: Subject to any disclaimer, the term of this patent is extended or adjusted under 35 U.S.C. 154(b) by 102 days.

(21) Appl. No.: 16/788,033

(22) Filed: Feb. 11, 2020

(65) Prior Publication Data

US 2021/0248864 A1     Aug. 12, 2021

(51) Int. Cl.
*G07F 17/32*     (2006.01)

(52) U.S. Cl.
CPC ...... *G07F 17/3213* (2013.01); *G07F 17/3258* (2013.01); *G07F 17/3265* (2013.01); *G07F 17/3267* (2013.01); *G01N 2474/00* (2021.08)

(58) Field of Classification Search
CPC ............. G07F 17/3213; G07F 17/3211; G07F 17/3265; G07F 17/3267; G01N 2474/00
USPC ....................................................... 463/20
See application file for complete search history.

(56) References Cited

U.S. PATENT DOCUMENTS

| | | | |
|---|---|---|---|
| 9,792,776 B2 | 10/2017 | Bigelow, Jr. et al. | |
| 10,332,340 B2 | 6/2019 | Caputo et al. | |
| 2003/0060269 A1* | 3/2003 | Paulsen | G07F 17/3213 463/20 |
| 2005/0239542 A1* | 10/2005 | Olsen | G07F 17/32 463/27 |
| 2010/0029381 A1* | 2/2010 | Vancura | G07F 17/3244 463/30 |
| 2011/0117989 A1* | 5/2011 | Kennedy | G07F 17/34 463/20 |
| 2014/0378218 A1 | 12/2014 | Baerlocher et al. | |
| 2016/0042597 A1* | 2/2016 | Olive | G07F 17/3213 463/21 |
| 2017/0092050 A1* | 3/2017 | Kitamura | G07F 17/34 |

* cited by examiner

*Primary Examiner* — Jay Trent Liddle
*Assistant Examiner* — Ryan Hsu
(74) *Attorney, Agent, or Firm* — McAndrews, Held & Malloy, Ltd.

(57) ABSTRACT

Some implementations may involve presenting a feature game round that includes a hold and spin stage and a free game stage. The free game stage may be presented after the hold and spin stage. In some examples, the number of free game instances may correspond to the number of configurable symbols accumulated by the conclusion of the hold and spin stage. In some instances, at least one of the configurable symbols accumulated by the conclusion of the hold and spin stage may indicate a modifier for the free game stage. The modifier may correspond with a modification of one or more reels that are used during a free game instance. In some examples, at least one of the configurable symbols accumulated during the hold and spin stage may indicate a multiplier for an award that is determined during a first free game instance.

20 Claims, 13 Drawing Sheets

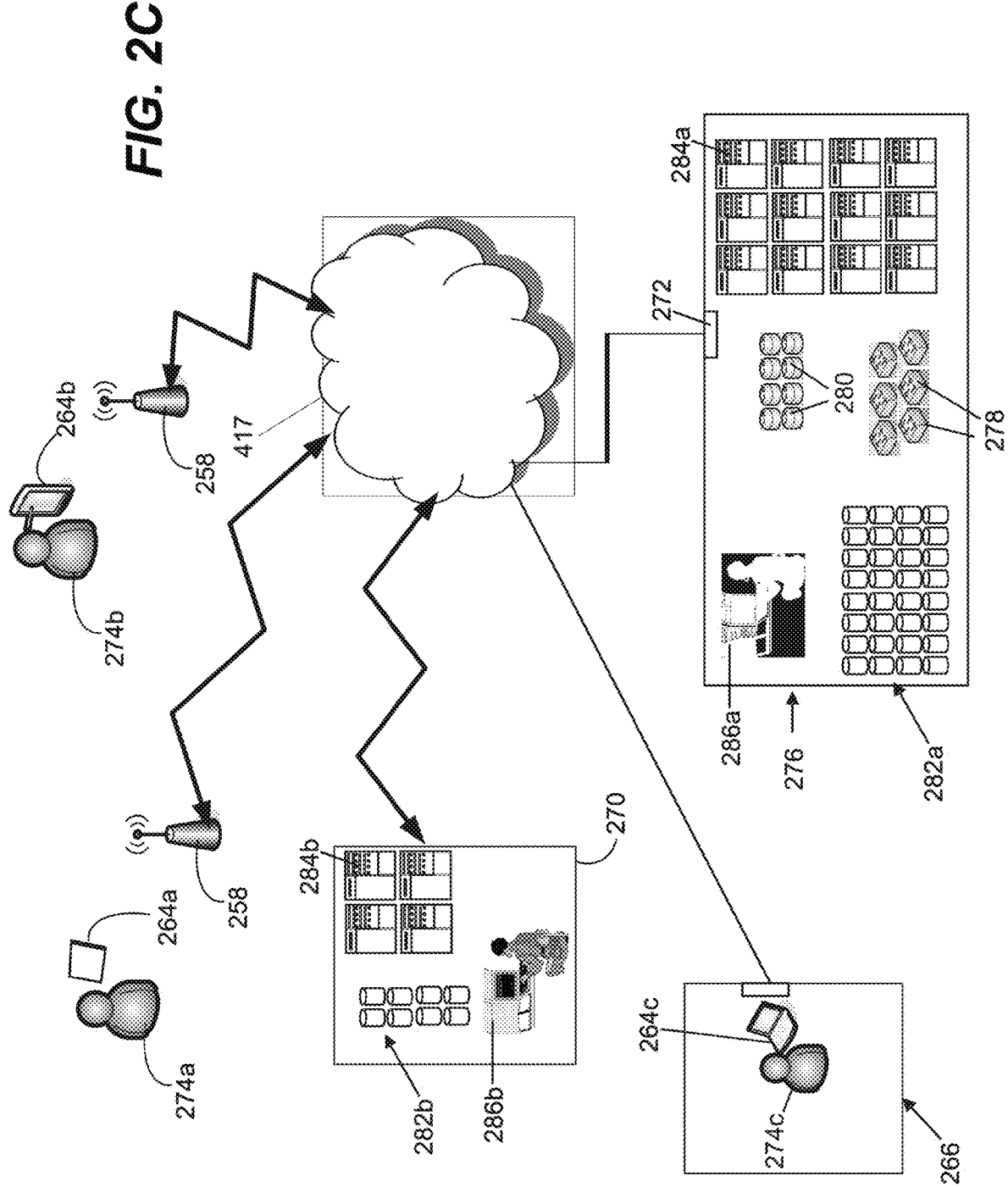

SYSTEM AND METHOD FOR A HOLD AND SPIN GAME WITH BUILD A BONUS

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Embodiments provide a gaming device, a method and gaming system with a spinning reel game having a base game, from which a feature game is triggered when a determined number of configurable symbols are displayed in a base game outcome. When the feature game is triggered, a hold and spin stage is displayed first, wherein the configurable symbols are held in place on the display and the player is provided one or more spins during the feature game in which to collect additional configurable symbols. Any additional configurable symbols are retained on the display during subsequent spins until the hold and spin stage of the feature game is completed. Subsequently, a free spin stage of the feature game is provided. In the free spin stage, the quantity of spins is based on the number of configurable symbols held at the end of the hold and spin stage. Each spin of the free spin stage contains a modifier, e.g., a multiplier, that applies to that spin of the free spin stage.

An embodiment provides a gaming device comprising a user interface system configured for receiving an indication to initiate one or more instances of a base game, the base game comprising a slot game; a display system comprising one or more display devices; and a control system comprising one or more processors, the control system executing instructions which cause the control system to at least: determine a base game outcome and corresponding display symbols, the display symbols selected from a symbol set comprising configurable symbols and non-configurable symbols; control the display system to display the corresponding display symbols at a plurality of display symbol positions on a display device of the display system; determine that a triggering number of configurable symbols is displayed in a base game outcome; control the gaming device to present a hold and spin stage of a feature game round, the hold and spin stage comprising one or more hold and spin instances, wherein presenting a hold and spin instance comprises: holding each displayed configurable symbol at its corresponding display symbol position; and selecting and displaying replacement symbols for non-configurable symbols in a plurality of display symbol positions not occupied by the held configurable symbols; determine a number of configurable symbols accumulated by the conclusion of the hold and spin stage; and control the gaming device to present a free game stage of the feature game round, the free game stage comprising a number of free game instances, the number of free game instances corresponding to the number of configurable symbols accumulated by the conclusion of the hold and spin stage, wherein at least one of the configurable symbols accumulated by the conclusion of the hold and spin stage indicates a first multiplier for an award that is determined during a first free game instance.

Another embodiment provides a method, comprising: determining a base game outcome and corresponding display symbols, the display symbols selected from a symbol set comprising configurable symbols and non-configurable symbols; controlling a display system of a gaming device to display the corresponding display symbols at a plurality of display symbol positions on a display device of the display system; determining that a triggering number of configurable symbols is displayed in a base game outcome; controlling the gaming device to present a hold and spin stage of a feature game round, the hold and spin stage comprising one or more hold and spin instances, wherein presenting a hold and spin instance comprises: holding each displayed configurable symbol at its corresponding display symbol position; and selecting and displaying replacement symbols for non-configurable symbols in a plurality of display symbol positions not occupied by the held configurable symbols; determining a number of configurable symbols accumulated by the conclusion of the hold and spin stage; and controlling the gaming device to present a free game stage of the feature game round, the free game stage comprising a number of free game instances, the number of free game instances corresponding to the number of configurable symbols accumulated by the conclusion of the hold and spin stage, wherein at least one of the configurable symbols accumulated by the conclusion of the hold and spin stage indicates a modifier for the free game stage.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

BRIEF DESCRIPTION OF THE DRAWINGS

FIG. 2C is a diagram that shows examples of components of a system for providing online gaming according to some aspects of the present disclosure.

Figure 1:
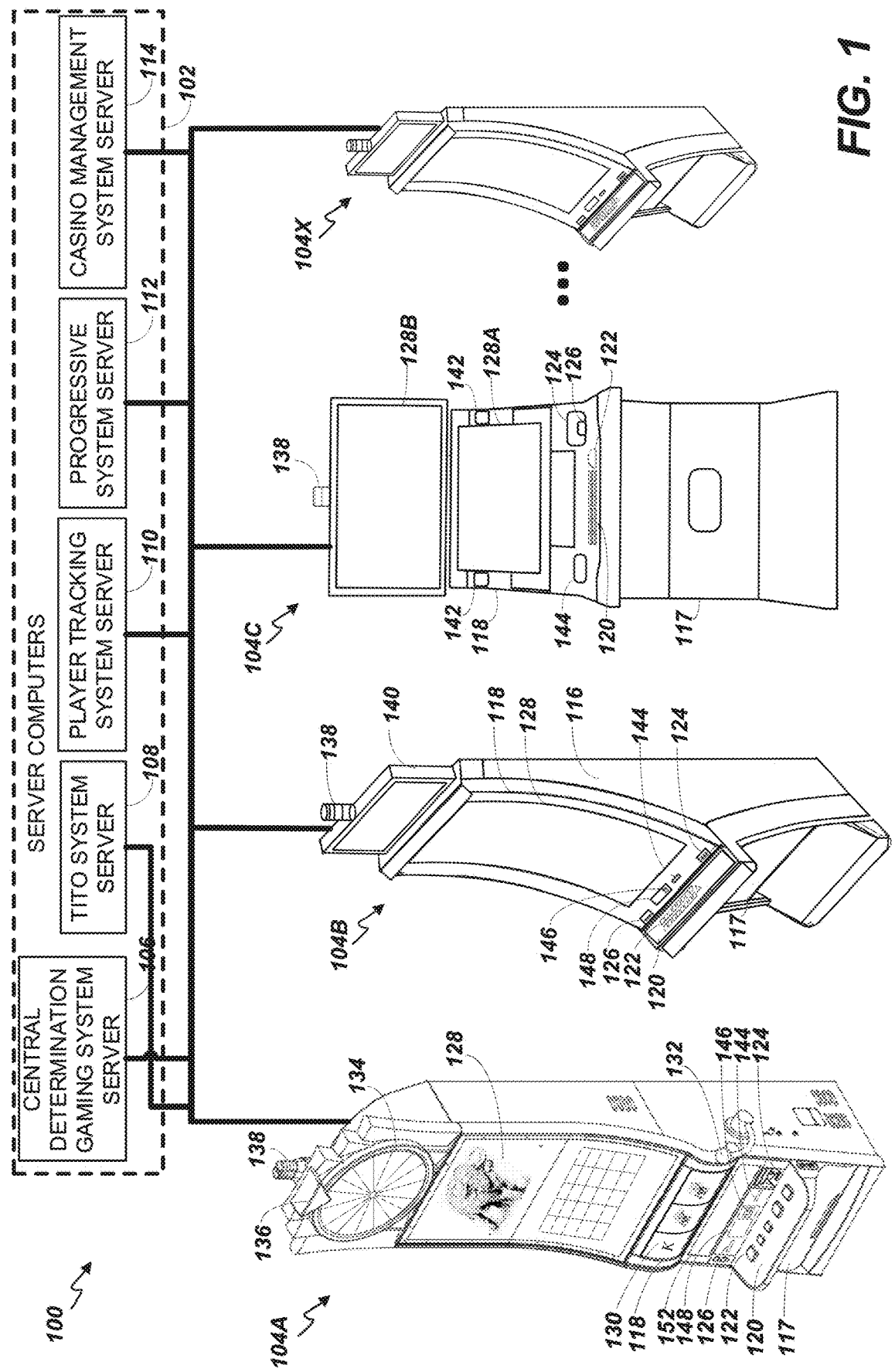
FIG. 1 is an example diagram showing several EGMs networked with various gaming-related servers.

The foregoing summary, as well as the following detailed description of certain embodiments of the present disclosure, will be better understood when read in conjunction with the appended drawings. For the purpose of illustrating the disclosure, certain embodiments are shown in the drawings. It should be understood, however, that the present disclosure is not limited to the arrangements and instrumentality shown in the attached drawings.

DETAILED DESCRIPTION

The present disclosure is generally directed to a feature game that includes a hold and spin stage and a free spin stage. In the hold and spin stage, value symbols may indicate a modifier, such as a multiplier value. After the hold and spin stage is completed, a free game round is provided, based on the quantity of multiplier symbols collected during the hold and spin stage. Each spin of the free spin game uses a multiplier value from one of the value symbols collected in the hold and spin stage.

Some implementations may involve presenting a feature game round that includes a hold and spin stage and a free game stage. The free game stage may be presented after the hold and spin stage. In some examples, the number of free game instances may correspond to the number of configurable symbols accumulated at the conclusion of the hold and spin stage. In some instances, at least one of the configurable symbols accumulated by the end of the hold and spin stage may indicate a modifier for the free game stage. The modifier may correspond with a modification of one or more reels that are used during a free game instance. In some examples, at least one of the configurable symbols accumulated during the hold and spin stage may indicate a multiplier for an award that is determined during a first free game instance.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaining devices 104A-104X that utilize the game outcomes and display the results to the players.

Gaming device 104A is often of a cabinet construction which may be aligned in rows or banks of similar devices for placement and operation on a casino floor. The gaining device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaining device manufactured by Aristocrat® Technologies, Inc. As shown, gaming device 104A is a reel machine having a gaining display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
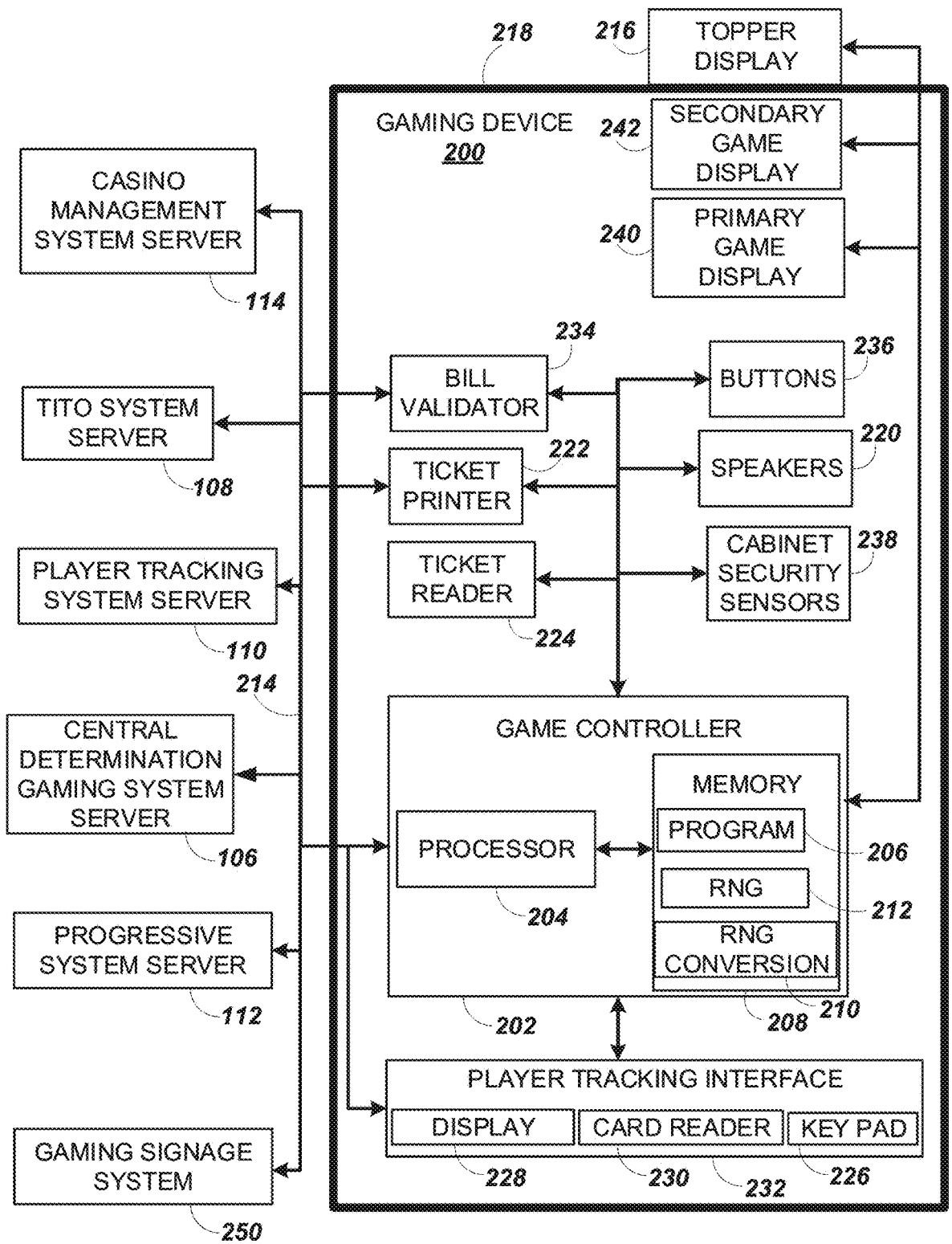
FIG. 2A is a block diagram showing various functional elements of an example EGM.

Many or all the above described components can be controlled by circuitry (e.g., a gaming controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting examples of internal electronic components of a gaming device 200 connected to various external systems. All or parts of the example gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaining system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaining devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 includes an RNG 212 that utilizes hardware and/or software to generate RNG outcomes that lack any pattern. The RNG operations are often specialized and non-generic in order to comply with regulatory and gaining requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). FIG. 2A illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
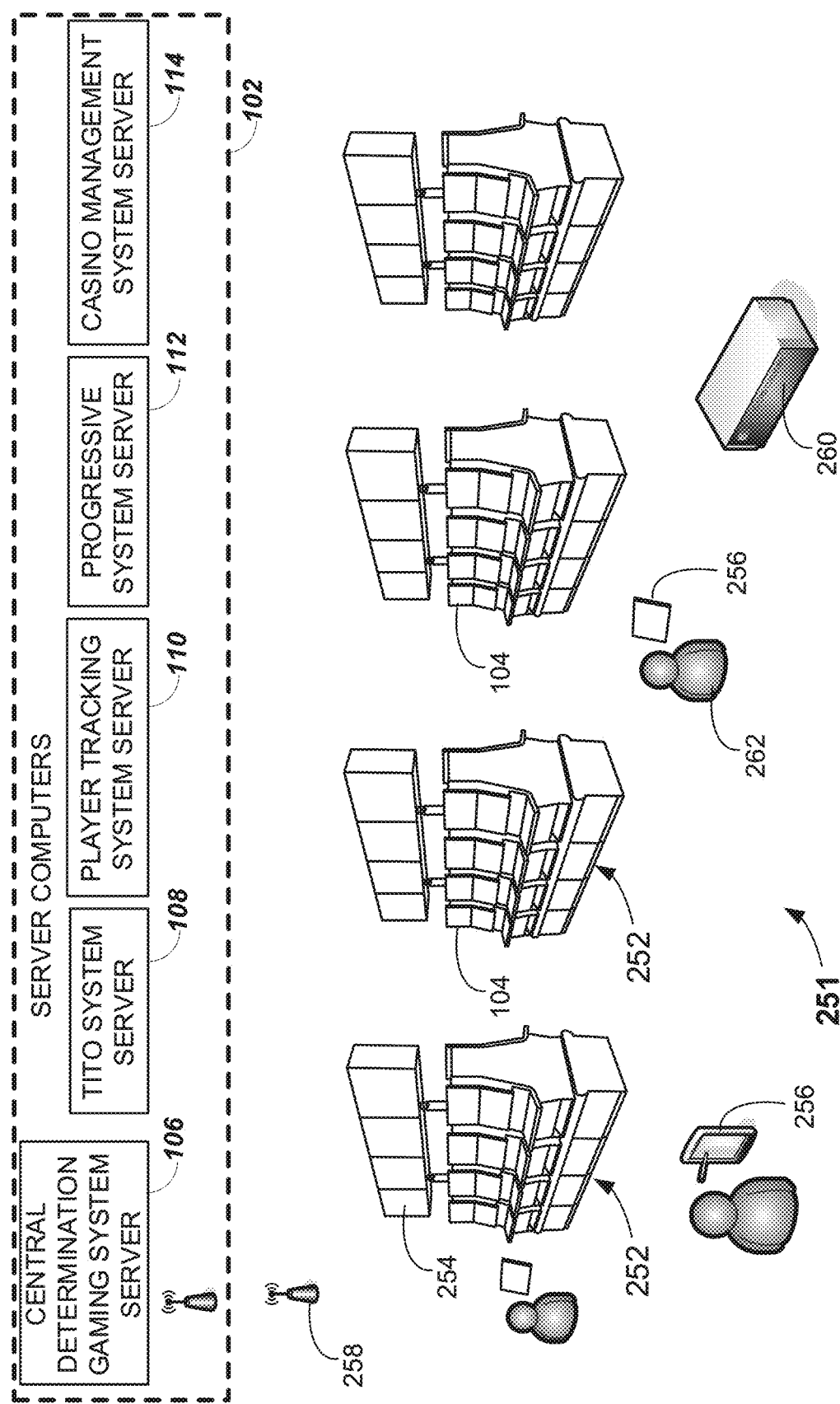
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254. According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaining regulatory authorities) may obtain gaming-related information via the gaining data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
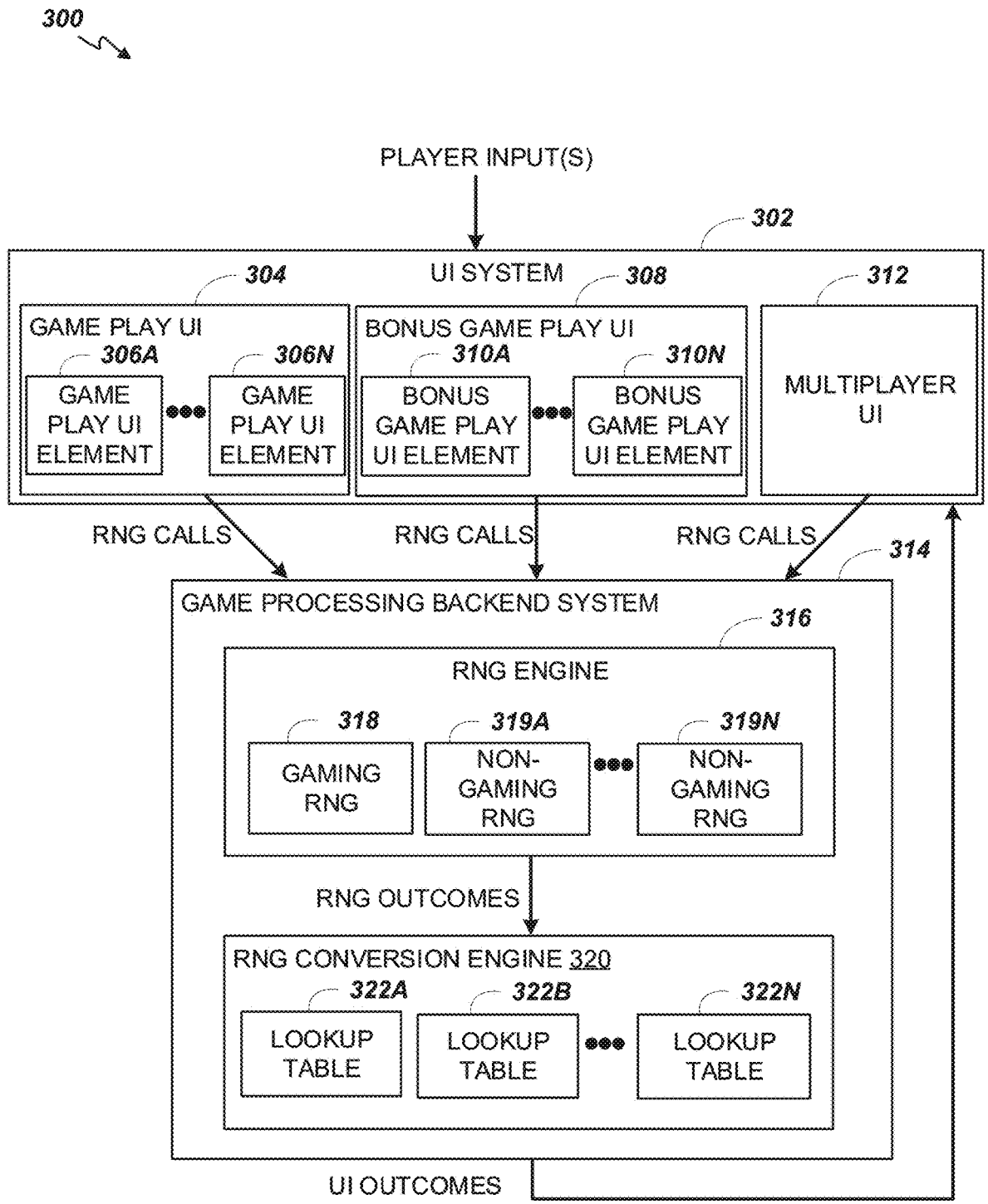
FIG. 3 illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2A, respectively. Alternatively, portions of the gaming processing architecture 300 can implement the game processing pipeline using a gaming device and one or more remote gaming devices, such as central determination gaming system server 106 shown in FIG. 1. In some such examples, the game processing pipeline may include a gaming device and one or more servers 284*a* of the gaming data center 276 shown in FIG. 2C. According to some such implementations, the gaming device may be a mobile device such as described above with reference to FIG. 2B or an EUD as described above with reference to FIG. 2C.

The UI system 302 includes one or more UIs that a player can interact with. The UI system 302 could include one or more game play UIs 304, one or more bonus game play UIs 304, and one or more multiplayer UIs 306, where each UI type includes one or more mechanical UIs and/or graphical UIs (GUIs). In other words, game play UI 304, bonus game play UI 304, and the multiplayer UI 304 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from to the bonus game play UI elements 310A-310N.

FIG. 3 also illustrates that UI system 302 could include a multiplayer UI 312 purposed for game play that differ or is separate from the typical base game. For example, multiplayer UI 302 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play.

After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS) and/or a hardware based RNG (not shown in FIG. 3). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for such as generating random messages that appear on the gaming device. The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RING conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

FIG. 3 shows examples of lookup tables 322A . . . 322N, which are also called weighted tables. In general, a weighted table can be implemented as any data structure that assigns probabilities to different options, in order for one of the different options to be selected using a random number. Different options are represented in different entries of a weighted table. The probabilities for different options can be reflected in threshold values (e.g., 1<RND<=40 for option 1, 40<RND<=70 for option 2, 70<RND<=90 for option 3, and 90<RND<=100 for option 4, given four options and a random number RND where 0<RND<=100). The threshold values can represent percentages or, more generally, sub-ranges within the range for a random number. In some example implementations, the threshold values for a weighted table are represented as count values for the respective entries of the weighted table. For example, the following table shows count values for the four options described above:

TABLE 1

Example Weighted Table

| count value | entry |
| --- | --- |
| 40 | <value a1, value a2, . . .> |
| 30 | <value b1, value b2, . . .> |
| 20 | <value c1, value c2, . . .> |
| 10 | <value d1, value d2, . . .> |

The sum total of the count values indicates the range of the options. Control logic can use a random number, generated between 1 and the sum total of the count values, to select one of the entries in the weighted table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected.

The threshold values for a weighted table can be fixed and pre-determined. Or, the threshold values for a weighted table can vary dynamically (e.g., depending on bet level). Or, a weighted table can be dynamically selected (e.g., depending on bet level) from among multiple available weighted tables. Different parameters or choices during game play can use different weighted tables. Or, different combinations of parameters or choices can be combined in entries of a given weighted table.

According to some examples, the example game processing architecture 300 shown in FIG. 3 can be used to process game play instructions and generate outcomes as shown and described herein. In response to a start condition (e.g., an indication of user input from a "play" button), the game play UI 304 may make one or more RNG calls to the game processing backend system 314. In response, the backend system 314 may perform various operations. Using a gaming RNG 318, the RNG engine 316 may generate one or more random numbers, which may be passed to the RNG conversion engine 320. The RNG conversion engine 320 may use the one or more random numbers (along with one or more of the lookup tables 322A-322N) to determine symbol stop positions for the active reels. The backend system 314 may also determine the outcome of the process (e.g., calculating whether any win conditions exist on pay lines).

In some instances, the RNG conversion engine 320, using one or more of the random number(s) and one or more of the lookup tables 322A . . . 322N, may select a UI outcome for a base game that corresponds with triggering a feature game round. According to some such examples, the RNG conversion engine 320 may determine that the UI outcome for the base game includes a triggering number of configurable symbols that will be displayed in a base game outcome.

In some such examples, triggering the feature game round may cause the UI system 302 to transition out of the base game to one or more bonus games. The bonus game play UI 308 may utilize bonus game play UI elements 310A-310N for a player to interact with and/or view during a feature game round that includes a hold and spin stage and a subsequent free game stage. The hold and spin stage may involve holding each displayed configurable symbol at its corresponding display symbol position. The hold and spin stage may involve selecting and displaying replacement symbols for non-configurable symbols in a plurality of display symbol positions not occupied by the held configurable symbols.

In some instances, the backend system 314 may determine a UI outcome that causes the bonus game play UI 308 to display one or more additional configurable symbols that will be held during the hold and spin stage. According to some such instances, at least one of the configurable symbols accumulated during the hold and spin stage may indicate a modifier for the free game stage of the feature game round. The modifier may correspond with a modification of one or more reels that are used during a free game instance. In some examples, at least one of the configurable symbols accumulated during the hold and spin stage may indicate a multiplier for an award that is determined during a corresponding free game instance.

Various embodiments of the present disclosure, as described herein, provide various improvements. For example, includes a first stage hold and spin round displaying non-credit and non-jackpot indicia allows the player to extend the time of play of the bonus round. Additionally, the user interface provided allows the user to clearly understand how the modifiers are applied to each round of the free spin game. Further, since the quantity of free spins is based on the quantity of accumulated configurable symbols, the player is able to easily understand anticipate the quantity of free spin games that are being provided.

Figure 4:
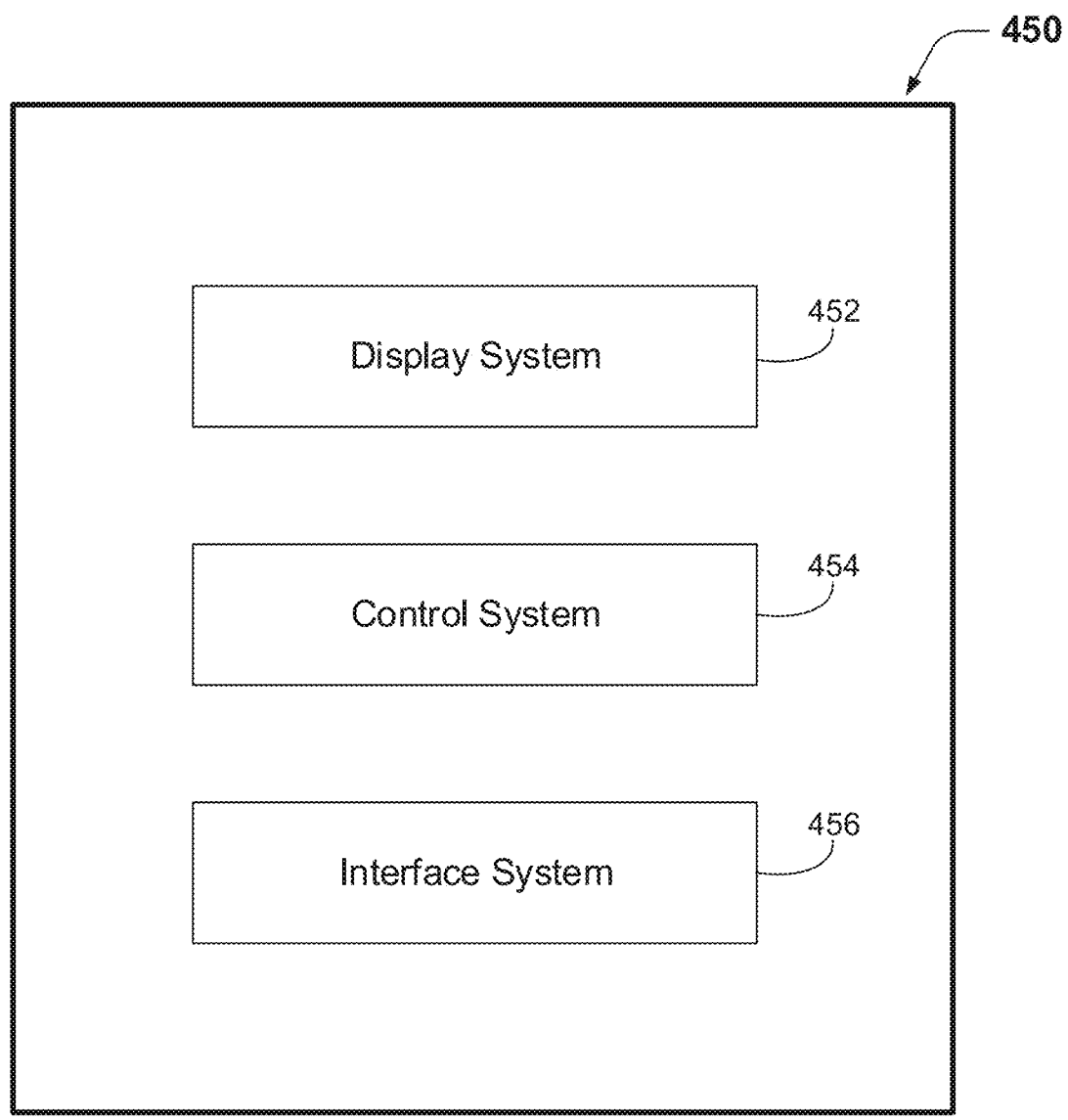
FIG. 4 is a block diagram that shows blocks of an apparatus according to one example.

FIG. 4 is a block diagram that shows blocks of an apparatus according to one example. According to some examples, the apparatus 450 may be, or may include, a gaming device. In some examples, the apparatus 450 may be an EGM such as those described above with reference to FIGS. 1 and 2A. However, in alternative examples, the apparatus 450 may be a mobile device such as described above with reference to FIG. 2B or an EUD as described above with reference to FIG. 2C.

In this example, the apparatus 450 includes a display system 452 and a control system 454 that is configured to communicate with the display system 452. In this example, the control system 454 is configured to communicate with the display system 452 via wired communication, e.g., via electrical signals. In alternative implementations, the control system 454 may be configured to communicate with the display system 452 via wireless communication. Accordingly, at least a portion of the control system 454 may be coupled to the display system 452. As used herein, the term "coupled to" has a meaning that could include being physically coupled for wired communication or being configured for wireless communication.

The control system 454 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. Although the interface system 456 is shown as being separate from the control system 454, in some implementations the interface system 456 may be part of the control system 454. In some implementations, the interface system 456 may include the entire control system 454. The control system 454 also may include (and/or be configured for communication with) one or more memory devices, such as one or more random access memory (RAM) devices, read-only memory (ROM) devices and/or other types of non-transitory media. In some implementations, at least a portion of the control system 454 may be implemented as a register. Accordingly, the apparatus 450 may have a memory system that includes one or more memory devices, though the memory system is not shown in FIG. 4. The game controller 202 of the gaming device 200 of FIG. 2A is one example of the control system 454.

The control system 454 may be capable of performing, at least in part, the methods disclosed herein. In some examples, the control system 454 may be capable of performing at least some of the methods described herein according to instructions (e.g., software) stored on one or more non-transitory media. For example, the control system 454 may be configured for controlling the display system 452 and/or for receiving and processing data from at least a portion of the display system 452, e.g., as described below.

The display system 452 may include, one or more liquid crystal displays (LCDs), plasma displays, light-emitting diode (LED) displays, microLED displays or organic light-emitting diode (OLED) displays. According to some implementations, the display system 452 may include at least one flexible display, such as a flexible OLED. In some embodiments, the display system 452 may include a primary display and/or a secondary display, such as the primary game display 240 and/or the secondary game display 242 described above with reference to FIG. 2A. Although shown as separate components in FIG. 4, the display system 452 may, in some examples, include at least a portion of the control system 454. For example, the display system 452 may include one or more processors, microprocessors, programmable logic devices, discrete gates or transistor logic, etc.

In the example shown in FIG. 4, the apparatus 450 includes an interface system 456. In some examples, the interface system may include a wireless interface system. In some implementations, the interface system 456 may include a network interface, an interface between the control system 454 and the display system 452, an interface between the control system 454 and a memory system and/or an interface between the control system 454 and an external device interface (e.g., a port or an applications processor). In some examples, the interface system 456 may include one or more user interfaces, such as a touch screen, one or more buttons, a gesture recognition system, a voice recognition system, etc. In some implementations, the interface system may include the buttons 236, speakers 220, player tracking interface 232, etc., shown in FIG. 2A and described above.

According to some implementations, the apparatus 450 may be a single device, whereas in other implementations the apparatus 450 may be a system that includes more than one device. Accordingly, the terms "apparatus" and "system" may sometimes be used interchangeably herein. In other examples, the apparatus 450 may be a component of another device. For example, in some implementations at least a portion of the display system 452 and/or the control system 454 may be included in more than one apparatus. For example, in some implementations at least part of the control system 454 may reside in a server, such as a central determination server or a gaming data center server. Some implementations of the apparatus 450 may not include a display system. In some such implementations, the control system 454 may be configured for controlling the display system of another device.

Figure 5:
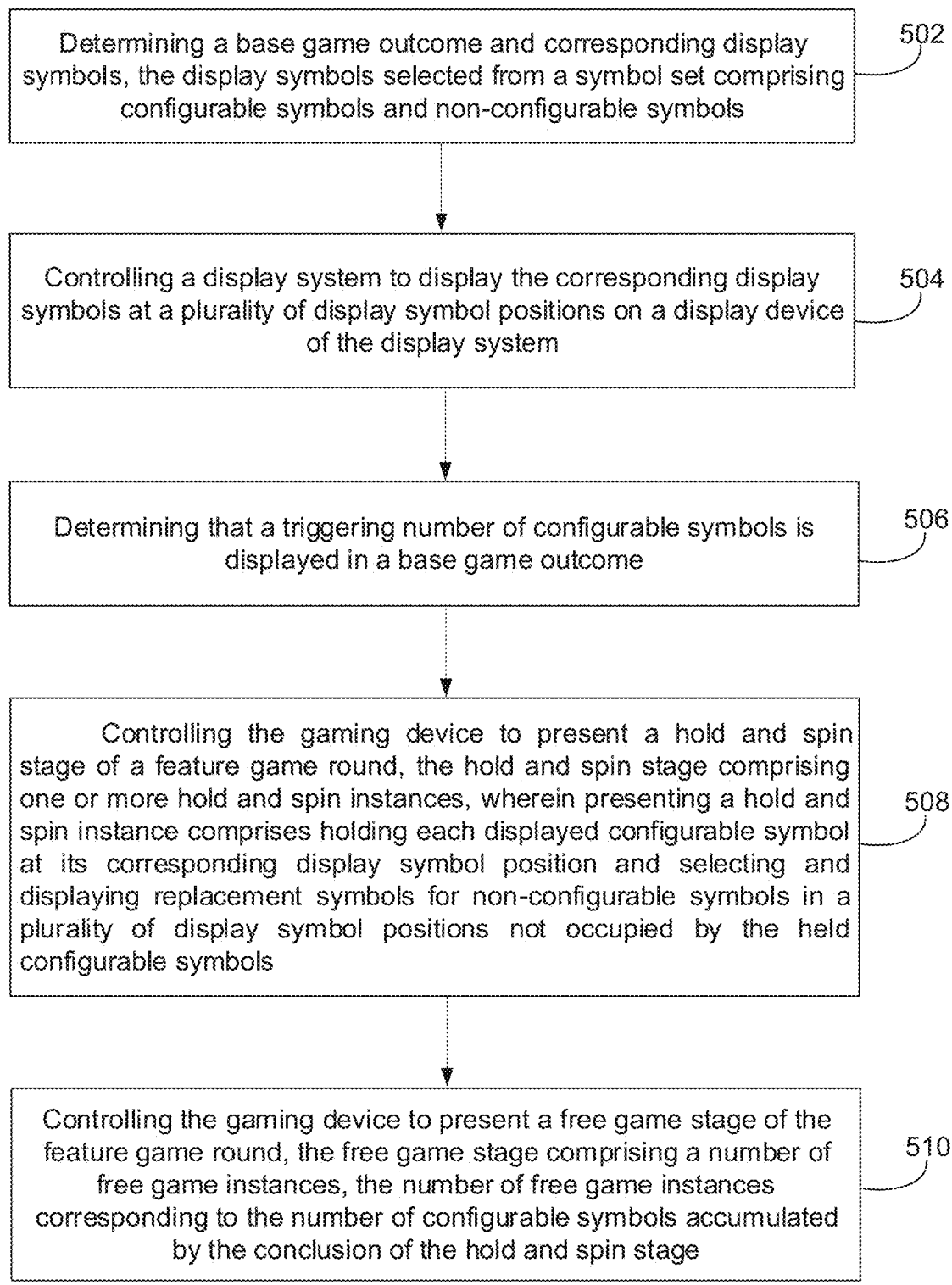
FIG. 5 is a flow diagram that shows blocks of a method according to one example.

FIG. 5 is a flow diagram that shows blocks of a method according to one example. In some examples method 500 may be performed, at least in part, by an apparatus such as that described above with reference to FIG. 4. In some examples, the method 500 may be performed, at least in part, by a control system (e.g., the control system 454 of FIG. 4) according to software stored upon one or more non-transitory storage media. According to some examples the method 500 may be performed, at least in part, by a processor, such as processor 204 of game controller 202. According to some examples the method 500 may be performed, at least in part, by a server, such as a central determination server or a gaming data center server.

As with other methods described herein, the number and sequence of blocks shown in FIG. 5 are merely examples. Similar disclosed methods may include more or fewer blocks. Moreover, at least some of the blocks may occur in a different sequence than the sequence that is shown in a flow diagram. For example, in some implementations block 506 will be performed before block 504. In some such examples, block 506 may be performed as part of block 502.

According to this example, block 502 involves determining a base game outcome and corresponding display symbols. In some such examples, block 502 may involve determining a slot game outcome and corresponding display symbols. In some examples, the determination of block 502 may be made via a control system of a gaming device. According to some such examples, both the UI system 302 and the game processing backend system 314 that are described above with reference to FIG. 3 may reside in a single gaming device.

In other examples, the determination of block 502 may be made, at least in part, by a server. According to some such examples, the server may determine both the slot game outcome and the corresponding display symbols. According to some such examples, both the UI system 302 and the game processing backend system 314 may reside in a single device, such as a single server.

In some examples, one device (e.g., a server) may determine at least a portion of the slot game outcome (e.g., a particular number of credits to be awarded, a particular number of configurable symbols that will be presented, etc.) and another device (e.g., a local gaming device on which a game is being presented) may determine the display symbols corresponding to the outcome obtained from the server. In some such examples, the UI system 302 may reside in one device and the game processing backend system 314 may reside in another device. According to some alternative examples, one server may implement at least a portion of the UI system 302 and another server may implement the game processing backend system 314.

According to some examples, the display symbols may be selected from a symbol set that includes configurable symbols and non-configurable symbols. The configurable symbols may, in some instances, include "prize on" or "what you see is what you get" (WYSIWYG) symbols. In some such examples, the configurable symbols may include symbols that indicate one or more types of jackpots, specific credit amounts to be awarded, multiplier symbols, reel modification symbols, etc. Some examples are described below with reference to a "hold and spin" stage of a feature game round. The symbol set may, in some instances, include various other types of symbols, such as symbols corresponding to a game theme. In some examples, the same symbols may be available during the base game and the hold and the feature game round, but in other examples at least one type of symbol may be available in the feature game round that is not available in the base game, or vice versa.

In some examples, block 502 may be performed subsequent to receiving, via a user interface of the gaming device, an indication to initiate an instance of a base game. For example, the user input may be received by the control system 454 of FIG. 4, via a user interface of the interface system 456. Block 502 may, for example, involve receiving an indication that a user has pressed a "play" button of a gaming device, receiving an indication that the user has touched an area of a touch screen that corresponds to a displayed image of a "play" button, etc. In some such implementations, block 502 (or a preceding block of method 500) may involve verifying that there is sufficient credit for at least one instance of a base game. According to some such implementations, the gaming device may include apparatus for receiving monetary credit.

According to some implementations, the value of at least one type of configurable symbol may depend, at least in part, on a current wager level. In some such implementations, the user interface system may be configured for receiving an indication of a wager amount. According to some such implementations, in response to receiving the indication of the determined wager amount, a control system (e.g., a control system of a gaming device) may be configured to determine a corresponding increase in a value of at least one configurable symbol. In some such implementations, in response to receiving the indication of the determined wager amount, the control system may be configured to determine that at least one jackpot will become available. According to some such implementations, the control system may be configured to control the display system to provide an indication that the at least one jackpot has become available.

According to this implementation, block 504 involves controlling a display system of a gaming device to display the corresponding display symbols at a plurality of display symbol positions on a display device of the display system. In some examples, the display symbol positions may be arranged in a plurality of active display symbol rows and a plurality of active display symbol columns. However, in other examples, the display symbol positions may be arranged in other ways, e.g., along curves, in lines that radiate from one or more central areas, etc.

In this example, block 506 involves determining that a triggering number of configurable symbols is, or will be, displayed in a base game outcome. According to this example, the triggering number of configurable symbols triggers a feature game round. The triggering number of configurable symbols may vary according to the particular implementation. In some examples, the triggering number of configurable symbols may be 4, 5, 6, 7, 8, etc. In some alternative examples, another trigger condition may trigger the feature game round. In some such examples, a predetermined symbol combination may trigger the feature game round. The predetermined symbol combination may or may not include configurable symbols, depending on the particular implementation. In some alternative examples, a scatter of a quantity of symbols may trigger the feature game round. In some implementations block 506 may be performed before block 504 and in other implementations block 506 may be performed after block 504. In some such examples, block 506 may be performed as part of block 502. If the determination is that the triggering number of configurable symbols is not displayed, or to be displayed, in the base game outcome, method 500 may end. Method 500 may be invoked again after receipt of an indication to initiate an instance of a base game According to this implementation, block 508 involves controlling the gaming device to present a hold and spin stage of a feature game round. The hold and spin stage may include one or more hold and spin instances. In this example, presenting a hold and spin instance involves holding each displayed configurable symbol at its corresponding display symbol position. In this implementation, presenting a hold and spin instance also involves selecting and displaying replacement symbols for non-configurable symbols in a plurality of display symbol positions not occupied by the held configurable symbols. According to some examples, the hold and spin stage may include only a fixed number of hold and spin instances, e.g., 3, 4, 5, 6, etc. In other examples, the hold and spin stage may include an initial number of hold and spin instances, e.g., 3 or 4, and also may include additional hold and spin instances that may be awarded according to events during a hold and spin instance. In various embodiments, the initial number of hold and spin instances may be based on one or more of, the wager amount, the quantity of triggering symbols, etc. According to some implementations, an additional hold and spin instance may be awarded each time a particular type of symbol (such as a configurable symbol) lands during a hold and spin instance. In some examples, the replacement symbols may be selected from the same symbol set used in the base game, whereas in other implementations one or more different symbols may be included during the feature game round. For example, in certain implementations, replacement symbols may be selected from a group consisting of one or more of: configurable symbols, blank symbols, and non-configurable symbols. In certain examples, each symbol display position corresponds to a reel having one or more of: configurable symbols, blank symbols, and non-configurable symbols.

In some examples, there is no award during the hold and spin stage unless some type of jackpot is to be awarded. According to some such examples, a jackpot may be awarded if at least a threshold number of configurable symbols is accumulated by the conclusion of the hold and spin stage (e.g., 10, 11, 12, 13, etc.). According to some examples, more than one type of jackpot may potentially be awarded. According to some such examples, a first type of jackpot may be awarded if a first number of configurable symbols is accumulated by the conclusion of the hold and spin stage (e.g., 9, 10 or 11), a second type of jackpot may be awarded if a second number of configurable symbols is accumulated by the conclusion of the hold and spin stage (e.g., 12, 13 or 14) and a third type of jackpot may be awarded if a third number of configurable symbols is accumulated by the conclusion of the hold and spin stage (e.g., if all active symbol positions include a configurable symbol). Otherwise, the awards (if any) of the feature game round are determined during the subsequent free spin round. However, in some alternative implementations, one or more awards may be obtained during the hold and spin stage even if some type of jackpot is not won. In various implementations, block 508 may involve determining a number of configurable symbols accumulated by the conclusion of the hold and spin stage.

In this example, block 510 involves controlling the gaming device to present a free game stage of the feature game round. According to this implementation, the free game stage includes a number of free game instances that corresponds to the number of configurable symbols accumulated at the conclusion of the hold and spin stage. In this example, the free game stage is presented after the hold and spin stage.

In some instances, at least one of the configurable symbols accumulated at the conclusion of the hold and spin stage may indicate a modifier for the free game stage. In some such examples, the modifier may be, or may include, a multiplier. According to some implementations, at least one of the configurable symbols accumulated at the conclusion of the hold and spin stage may indicate a first multiplier may be applied to an award that is determined during a first free game instance. In some such implementations, at least one of the configurable symbols accumulated by the conclusion of the hold and spin stage may indicate a second multiplier for an award that is determined during a second free game instance. Some examples are described below with reference to FIG. 6 et seq.

Alternatively, or additionally, at least one of the configurable symbols accumulated by the conclusion of the hold and spin stage may indicate a different type of modifier. For example, the modifier may correspond with a modification of one or more reels that are used during a free game instance. According to some implementations, the modification of the one or more reels may involve adding one or more wild symbols to the one or more reels and/or adding one or more jackpot symbols to the one or more reels.

As noted above, in some instances the plurality of display symbol positions may include a plurality of rows and a plurality of columns. According to some such implementations, the modification of the one or more reels may involve adding one or more rows and/or one or more columns to the plurality of display symbol positions. Some such examples may involve adding one or more rows and/or one or more columns of wild symbols to the plurality of display symbol positions.

In some instances, the plurality of display symbol positions may include a first matrix of display symbol positions. In some implementations, the modification of the one or more reels may involve adding a second matrix of display symbol positions.

In some instances, the modifier may be a quantity of wild symbols that are to be provided for a play of the subsequent free spin round. The wild symbols may be placed at randomly selected symbol positions in the matrix to replace symbols. In other embodiments, the wild symbols may be placed at predefined symbol positions in the matrix. In some instances, the modifier may be a combination of a multiplier with wild. In this implementation, a wild symbol in the free spin round may be associated with a corresponding multiplier value.

As will be appreciated by those skilled in the art, the exemplary method described above provides a two stage game, wherein the first stage includes configurable symbols that display a non-credit, non-jackpot value that does not have an award value. The second stage uses these accumulated configurable values to play a quantity (determined based on the quantity of configurable symbols held in the first stage) of free spins, where each round of the free spin includes a corresponding modifier from a corresponding configurable symbol.

Figure 6:
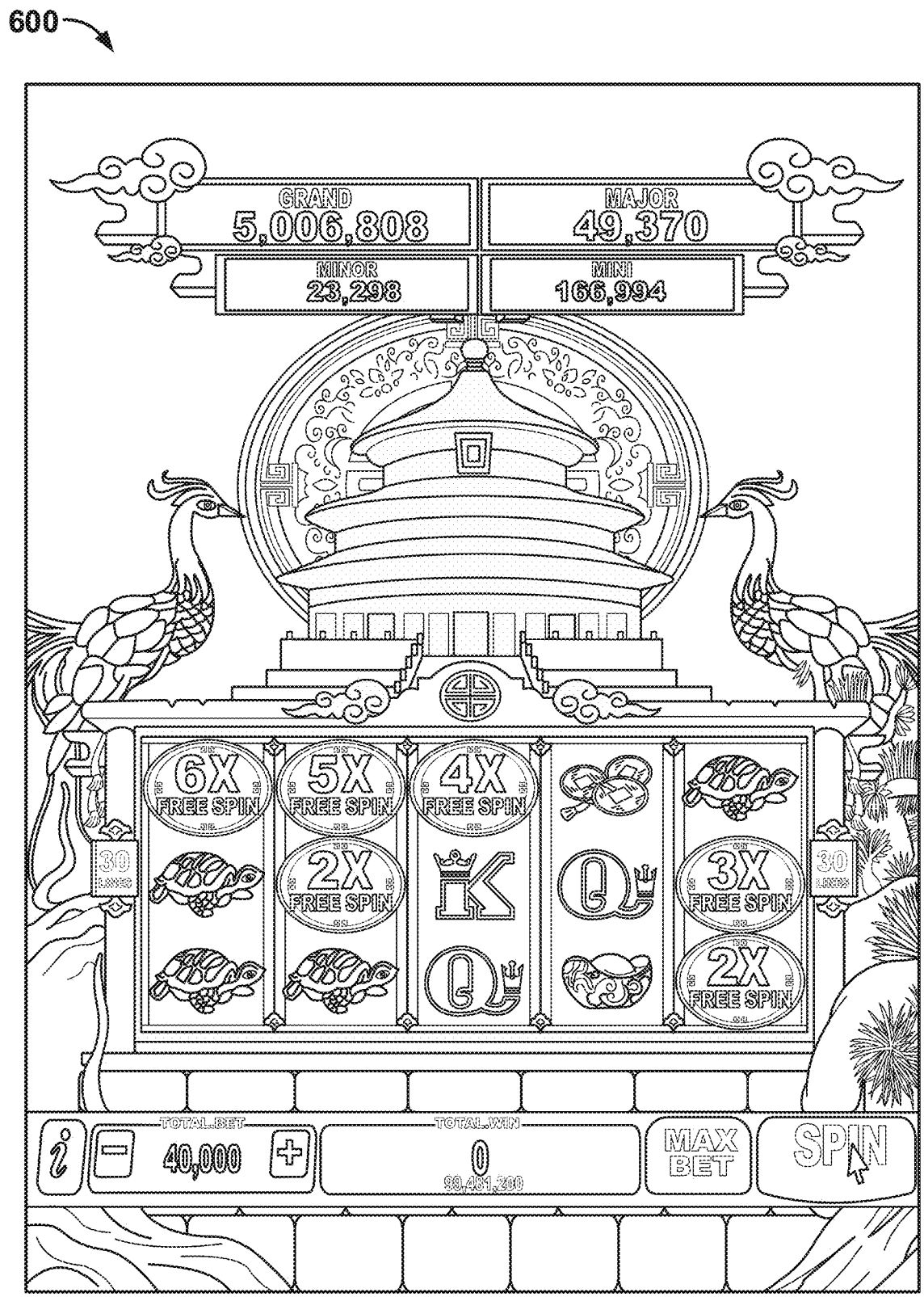
FIG. 6 shows an example of a display that may be presented according to one implementation of the method of FIG. 5.

FIG. 6 shows an example of a display that may be presented according to one implementation of the method of FIG. 5. As with other implementations provided herein, the particular types of elements and the particular arrangement of elements shown in FIG. 6 are merely examples.

In this example, a triggering number of configurable symbols is being displayed in a base game outcome of the display 600. According to this example, each of the configurable symbols that are being displayed in the base game outcome indicate a modifier for a free game stage of a feature presentation. In this example, each of the configurable symbols indicates a multiplier to be applied to an award that is determined during a free game instance. In this example, a maximum bet of 40,000 was being wagered for the base game instance, so all four jackpots are "unlocked" and available.

Figure 7:
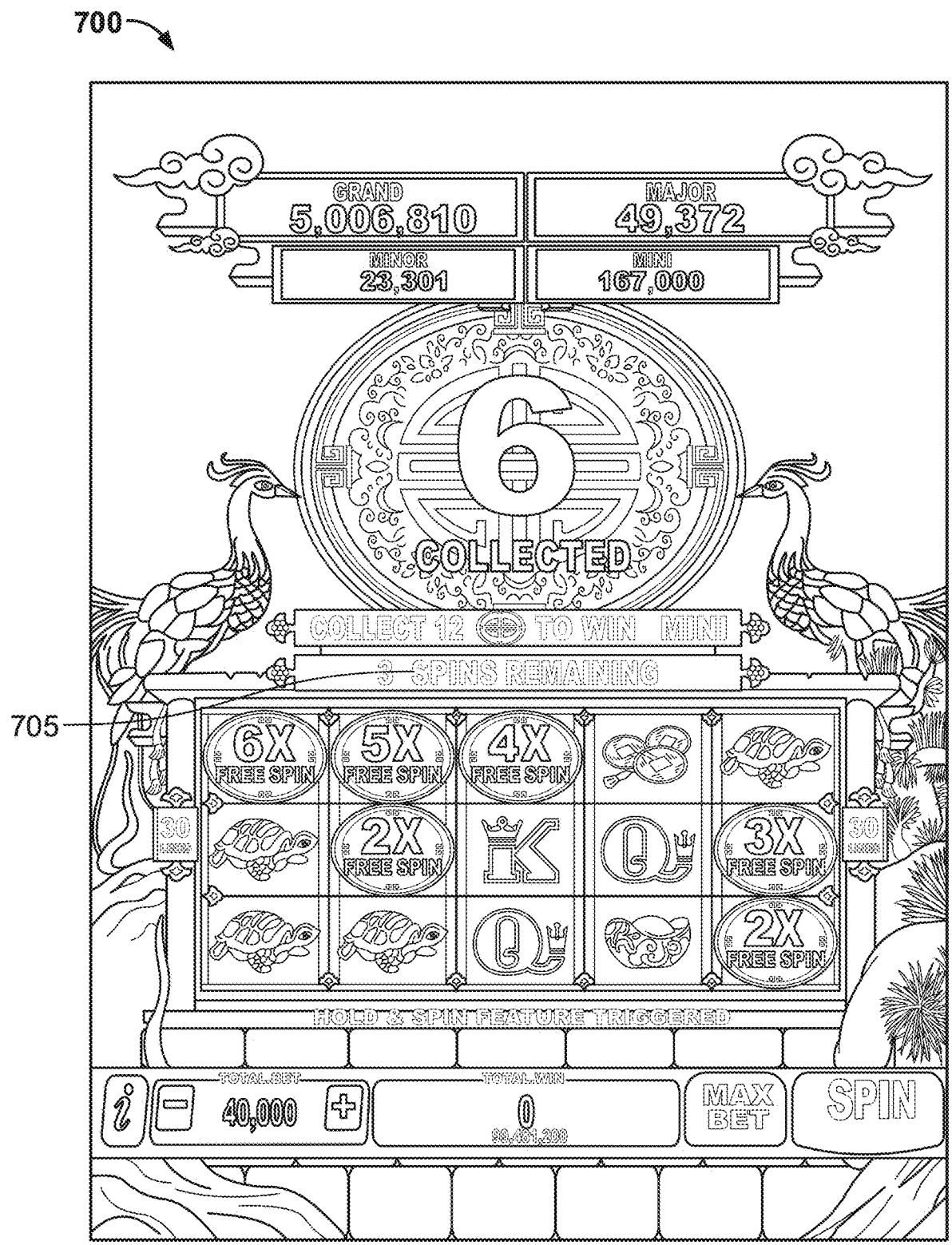
FIG. 7 shows an example of a display that may be presented after the display of FIG. 6 according to some examples.

FIG. 7 shows an example of a display that may be presented after the display of FIG. 6 according to some examples. According to this example, the display 700 is an example of a GUI that may be presented at the beginning of a hold and spin stage of a feature game round. In this example, the display 700 indicates the number of configurable symbols (six) that were obtained during the preceding base game instance. The configurable symbols will be held in place during the hold and spin stage of the feature game round. During each hold and spin instance, replacement symbols for the non-configurable symbols will be selected and displayed in display symbol positions not occupied by the held configurable symbols. Accordingly, in some examples the display 700 may present the configurable symbols that were obtained during the base game instance in bright colors and may present the non-configurable symbols that were obtained during the base game instance in dim, greyed-out colors.

In this example, area 705 of the display 700 indicates the number of instances or "spins" remaining in the hold and spin stage of the feature game round. According to this example, the number of remaining spins is decremented by one during each hold and spin instance. If an additional configurable symbol lands during a hold and spin instance, the number of remaining spins is reset to the initial count, i.e. three. In other embodiments, the number of remaining spins is incremented by one. However, in this implementation the maximum number of remaining free spins cannot exceed a predetermined threshold number, which is three in this example.

In some examples, no award will be granted during the hold and spin stage unless some type of jackpot is won. However, in some alternative implementations, one or more awards may be obtained during the hold and spin round even if some type of jackpot is not won.

Figure 8:
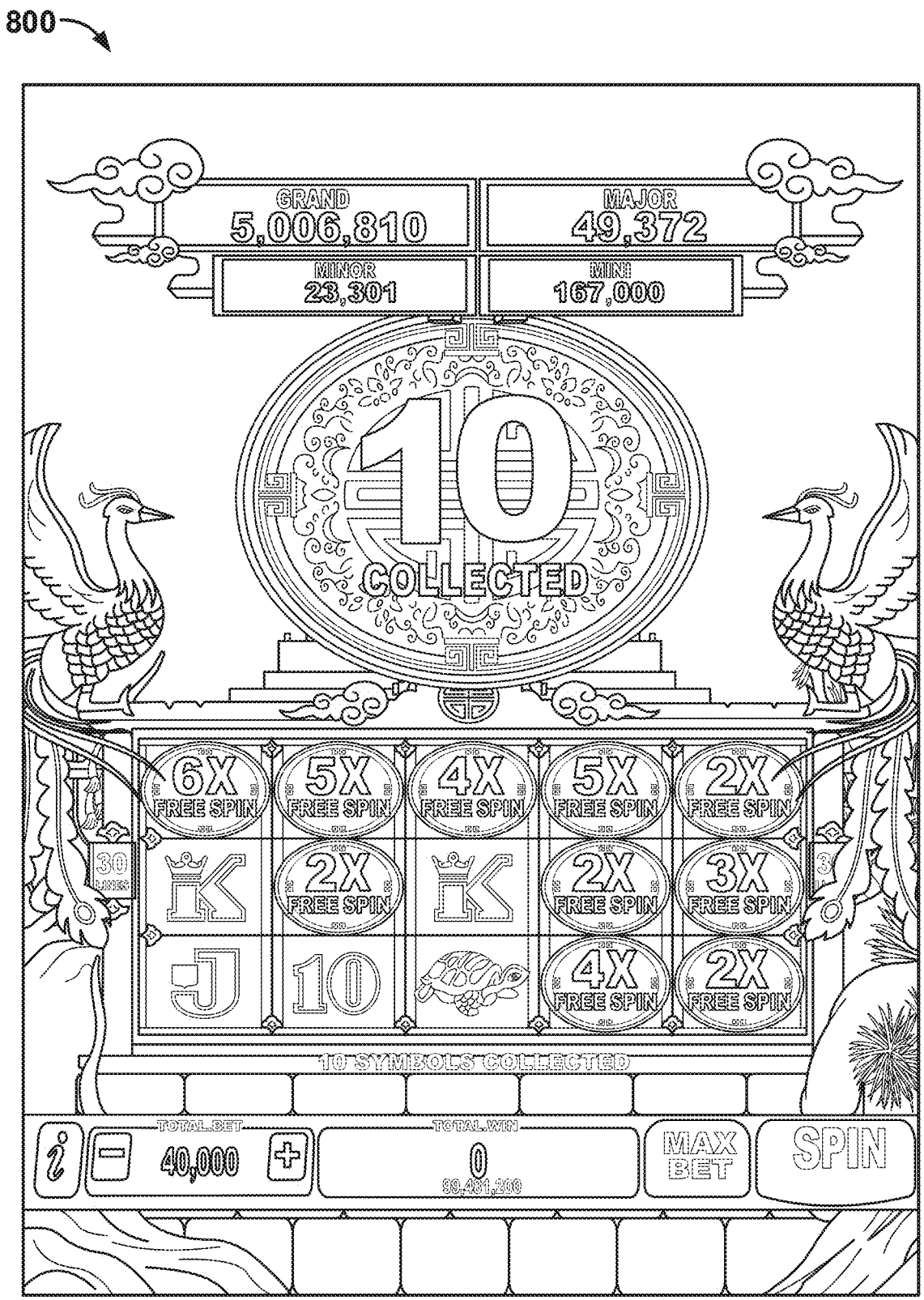
FIG. 8 shows an example of a display that may be presented after the display of FIG. 7 according to some examples.

FIG. 8 shows an example of a display that may be presented after the display of FIG. 7 according to some examples. According to this example, the display 800 is an example of a GUI that may be presented at the end of a hold and spin stage of a feature game round. In this example, the display 800 indicates the number of configurable symbols (ten) that were accumulated by the conclusion of the hold and spin stage.

Figure 9:
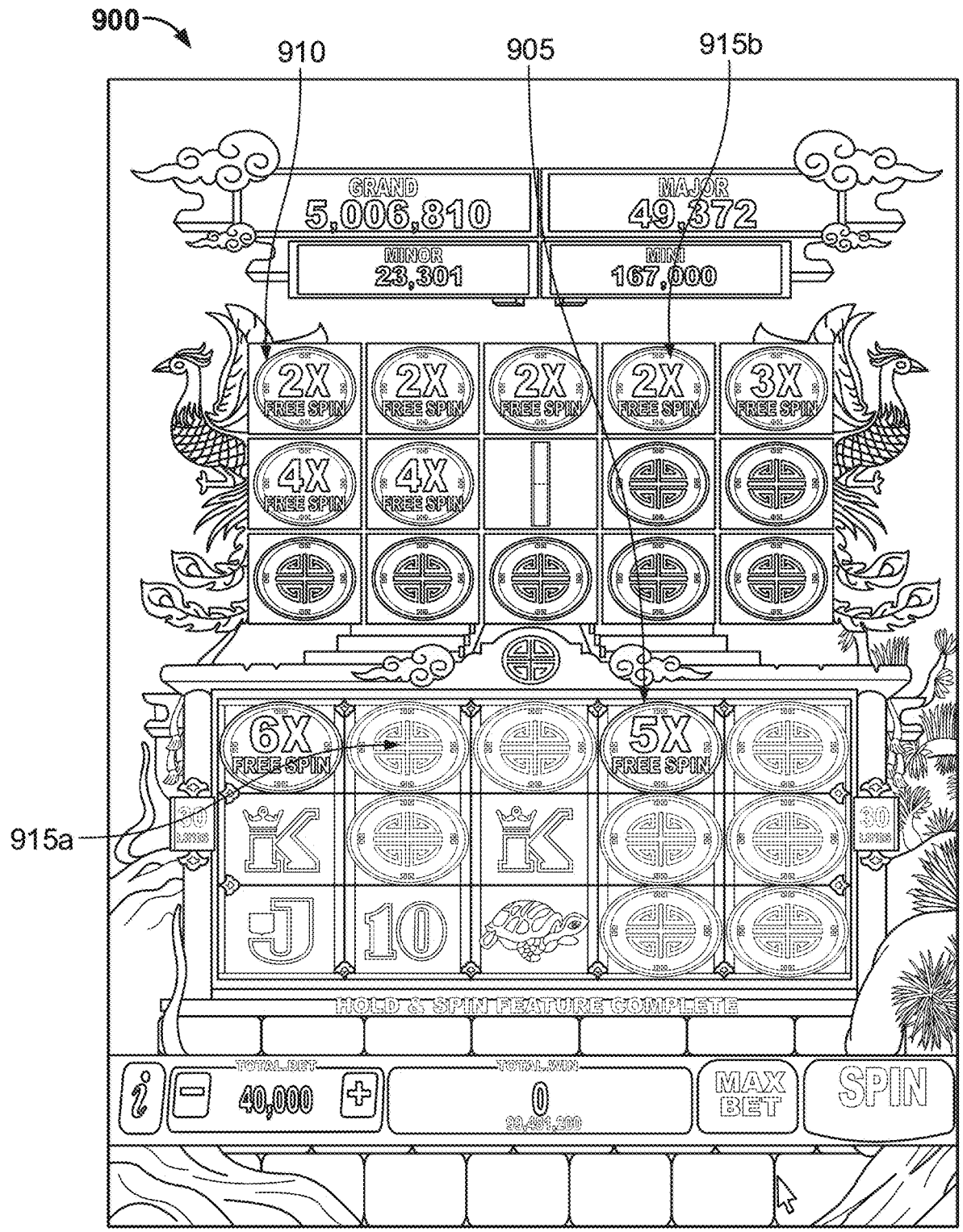
FIG. 9 shows an example of a display that may be presented after the display of FIG. 8 according to some examples.

FIG. 9 shows an example of a display that may be presented after the display of FIG. 8 according to some examples. According to this example, the display 900 is an example of a GUI that may be presented in a transitional phase of a feature game round, after the end of a hold and spin stage and before a free game stage. In this example, the display 900 includes a display area 905 in which display symbols will be presented during free game instances.

According to this example, the display 900 also includes a display area 910 in which the configurable symbols that were accumulated by the conclusion of the hold and spin stage will be presented. In this example, the transitional phase of the feature game round involves moving the configurable symbols from the display area 905 to the display area 910. According to this example, the configurable symbols are arranged from the lowest multiplier to the highest multiplier. In this example, the free spins are subsequently played in the same order. However, in other implementations the configurable symbols may be arranged in a different order. At the moment depicted by FIG. 9, the configurable symbol 915*a* is moving from the display area 905 to the display area 910. In this example, the number of configurable symbols accumulated by the end of the hold and spin stage determines the number of free spins in the subsequent free game stage.

Figure 10:
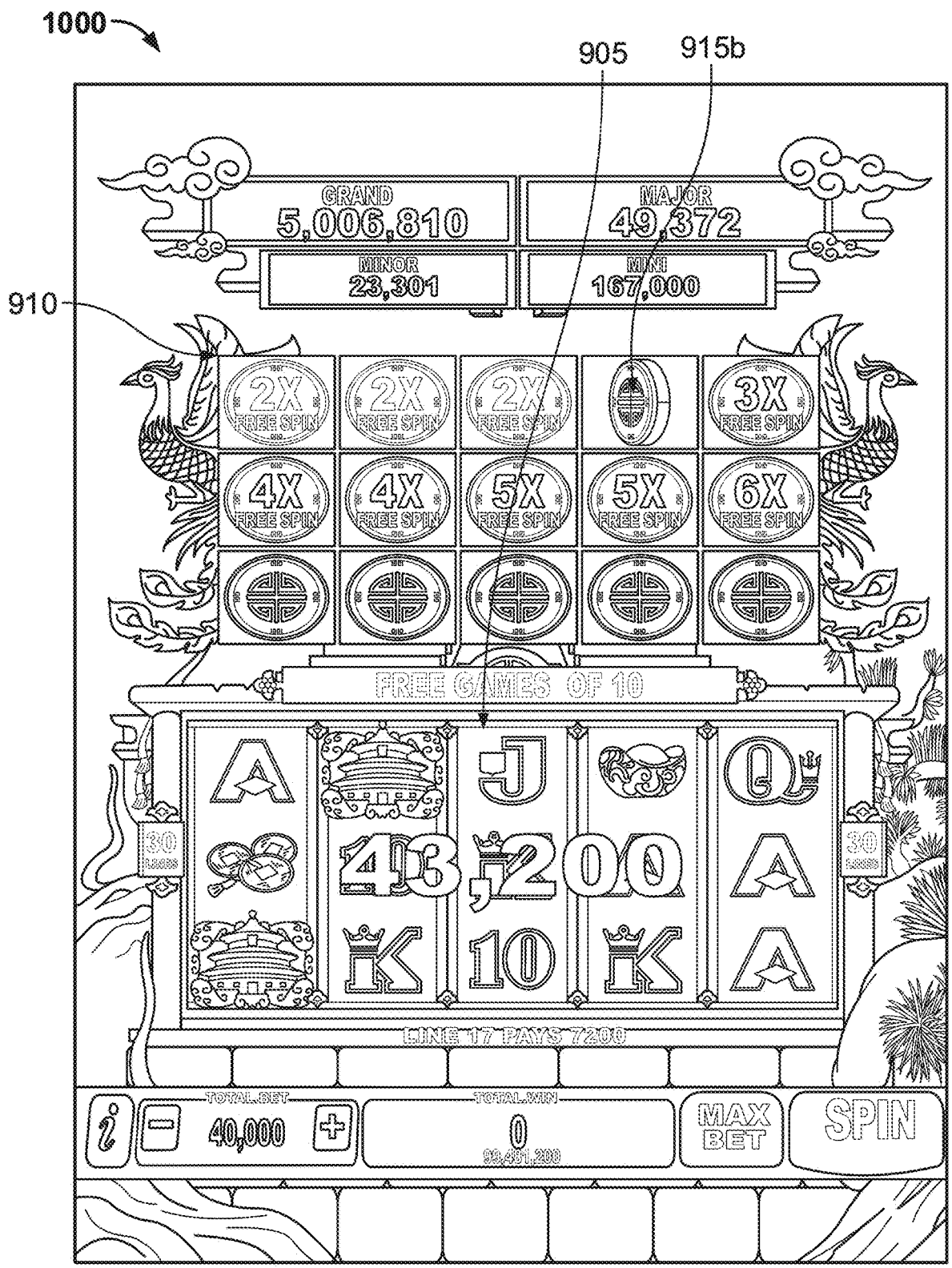
FIG. 10 shows an example of a display that may be presented after the display of FIG. 9 according to some examples.

FIG. 10 shows an example of a display that may be presented after the display of FIG. 9 according to some examples. According to this example, the display 1000 is an example of a GUI that may be presented during a free spin stage of a feature game round. In this example, a fourth free game instance of the free game stage has been presented in the display area 905. During this fourth free game instance, an award has been granted and the award has been doubled (multiplied by 2×), according to the multiplier of the corresponding configurable symbol 915*b*. The value of the multiplier of the configurable symbol 915*b* may be seen in FIG. 9, but at the moment shown in FIG. 10, the configurable symbol 915*b* is shown to be rotating so that a back side can be viewed. The award granted in the fourth free game instance will be presented on the back side of the configurable symbol 915*b*, as shown in FIG. 11.

Figure 11:
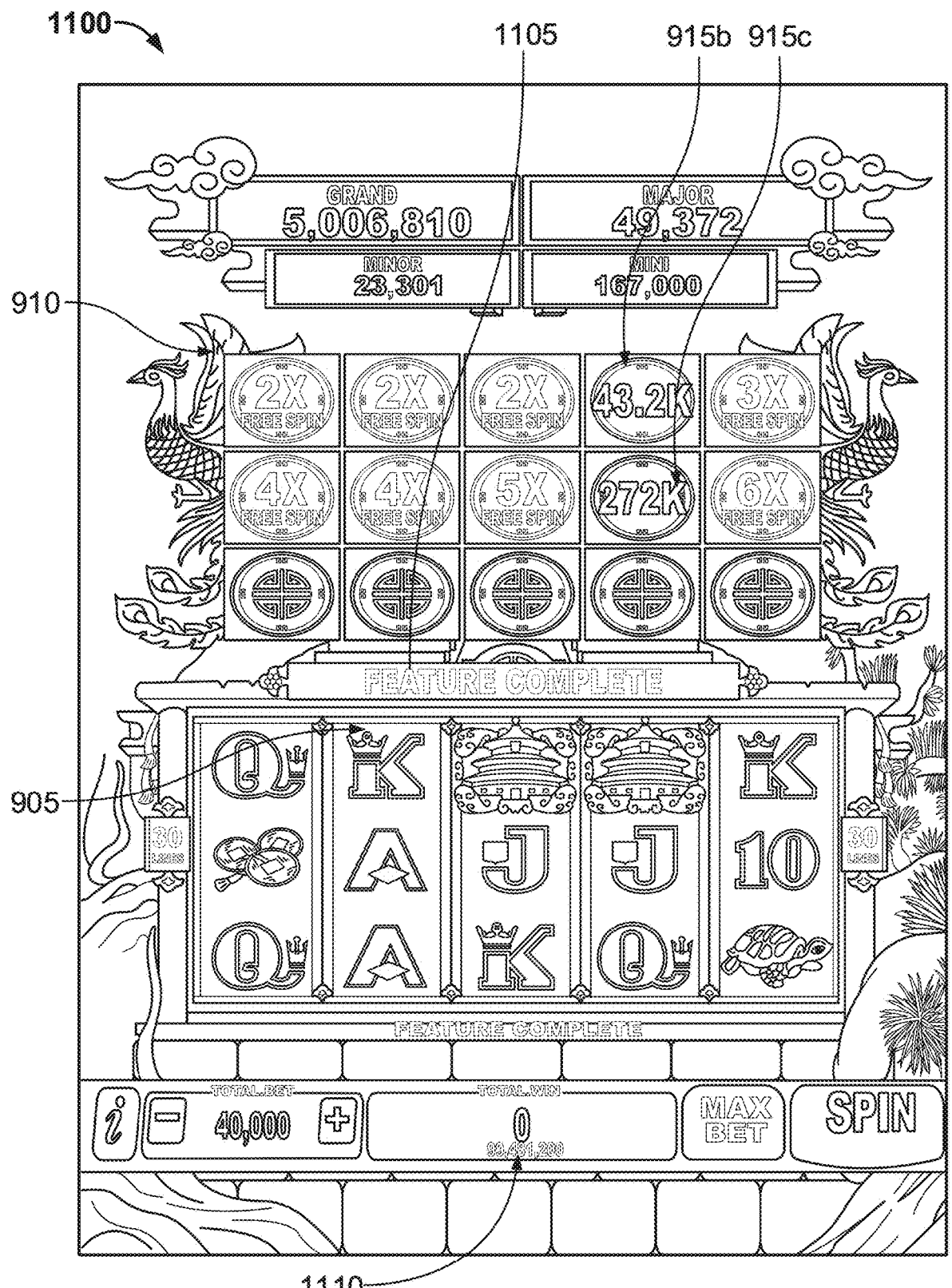
FIG. 11 shows an example of a display that may be presented after the display of FIG. 10 according to some examples.

FIG. 11 shows an example of a display that may be presented after the display of FIG. 10 according to some examples. According to this example, the display 1100 is an example of a GUI that may be presented during the end of a free spin stage of a feature game round. In this example, area 1105 of the display 1100 indicates that the feature game round has been completed. At the moment shown in FIG. 11, the configurable symbol 915*b* indicates the 43.2 K award determined in the fourth free game instance and the configurable symbol 915*c* indicates a 272 K award determined in a ninth free game instance. In some implementations, the total of the awards determined during the free spin stage of the feature game may subsequently be displayed in the area 1110. A celebration may be presented, which may include music, celebratory images, etc. The award amount is added to the total win amount and the credit balance is increased to reflect the new balance to include the total award amount.

In various embodiments, the free game stage of the feature game round may be presented as a quantity of spins of a wheel, or a quantity of picks from a plurality of prize icons.

In some embodiments, one or more additional enhancing reels may be provided to enhance the player's chances of triggering the feature game and/or a resulting feature game award. For example, some embodiments may include an additional reel that may be selectively activated during play of the base game. In certain embodiments, the player may activate the additional reel by placing an additional wager, e.g., an ante bet, in connection with play of the base game. In some embodiments, the ante wager may, for example, be a fixed dollar or credit amount. In other embodiments, the ante wager may be a deter mined percentage (e.g., 50%, 75%, or 100%) of the base game wager.

The additional reel may provide for additional configurable symbols that increase the frequency and value of the hold and spin feature game. In some embodiments, the extra reel may contain only configurable symbols and blank symbols. In some embodiments, the extra reel may contain only configurable symbols. In some embodiments, in addition to the configurable symbols, the extra reel may contain high value symbols, scatter symbols, wild symbols, or any combination of these. When purchased, the extra reel may spin and work with the base game reels to trigger the feature game in the manner described above. In some embodiments, when the extra reel is not purchased, it remains stationary or is not displayed during base game play. In other embodiments, the extra reel may still spin when it is not purchased but it does not work with the base game reels, e.g., to trigger the feature game.

In some examples, an extra reel may include one or more multiplier symbols. According to some such examples, the extra reel may have a corresponding multiplier meter. In some such examples, the multiplier meters may be adjusted (e.g., increased or decreased) during play of a base game, e.g., according to the multiplier symbols. According to some instances, the multiplier meter values may be used to determine a feature game award when a feature game is triggered and completed.

In various embodiments, the base game may use any number of extra reels (e.g., 2, 3, 4 or 5 extra reels), charge any amount for each extra reel (e.g., 50% of the base game wager), put any number or type of symbols on an extra reel (e.g., only value symbols with jackpots), change symbols from spin to spin (e.g., value symbols may increase in value every 20 spins), and work with base game reels at any frequency (e.g., activates without ante bet every other spin).

In various embodiments, the size of the matrix for the play of the feature game and/or the base game may increase or decrease based on certain trigger conditions. For example, the play of the feature game may include certain trigger symbols that trigger the increase and/or the decrease of the matrix, or certain reels. For example, a reel growth trigger symbol, when selected, may increase the reel height of certain reels, such as reels 2, 3, and 4. In some embodiments, the reel growth trigger symbol may only occur during the play of the feature game. In some embodiments, the reel growth trigger symbol may only occur on certain reels, for example reel 1. Further, in some embodiments, the reel growth trigger symbol may be considered as a configurable symbol, such that it may be assigned to certain configurable symbol prior to the reels spinning for the next play of the base and/or feature game. Additionally, the reel growth trigger symbol, when occurring during the play of the feature game, may be held in place for the remaining plays of the feature game. In some embodiments, in addition to functioning as a trigger for reel growth, the reel growth trigger symbol may also have an assigned value, multiplier, additional spins, etc.

While specific examples have been described with respect to the figures, it will be appreciated that many modifications and changes may be made by those skilled in the art without departing from the scope of the present disclosure. For example, although some examples are described as embodiments of base games, the concepts disclosed herein can also be applied to other types of games, such as feature games or bonus games, e.g., free spins of a slot game. Similarly, although some examples are described as embodiments of feature games or bonus games, e.g., free spins of a slot game, the concepts disclosed herein can also be applied to other types of games, such as base games. Any variation and derivation from the above description and figures are included in the scope of the present disclosure as defined by the claims.

The invention claimed is:

1. A gaming device, comprising:
a user interface system configured for receiving an indication to initiate one or more instances of a base game, the base game comprising a slot game;
a display system comprising one or more display devices; and
a control system comprising one or more processors and a memory storing instructions, wherein execution of the instructions by the one or more processors causes the control system to at least:
control the display system to display corresponding display symbols of a base game outcome at display symbol positions of the display system;
in response to the base game outcome comprising a triggering number of configurable symbols, control the display system to present a hold and spin stage;
for each hold and spin instance of the hold and spin stage control the display system to:
hold at least one of a displayed configurable symbol at its corresponding display symbol position; and
display replacement symbols for non-configurable symbols at display symbol positions not occupied by configurable symbols; and
control the display system to present a free game stage comprising a number of free game instances corresponding to a number of configurable symbols accumulated by conclusion of the hold and spin stage;
wherein presentation of each free game instance causes the control system to:
control the display system to present a free game outcome; and
in response to the respective free game outcome being a winning outcome, control the display system to present an award that is based on a multiplier indicated by the configurable symbols accumulated by the conclusion of the hold and spin stage.

2. The gaming device of claim 1, wherein the configurable symbols accumulated by the conclusion of the hold and spin stage indicate a first multiplier for an award that is determined during a first free game instance and a second multiplier for an award that is determined during a second free game instance.

3. The gaming device of claim 1, wherein the configurable symbols accumulated by the conclusion of the hold and spin stage indicate a modifier for the free game stage.

4. The gaming device of claim 3, wherein the execution of the instructions causes the control system, in response to the modifier, to control the display system to modify one or more reels that are used during a free game instance of the free game stage.

5. The gaming device of claim 4, wherein the execution of the instructions causes the control system to modify the one or more reels by at least one of adding one or more wild symbols to the one or more reels or adding one or more jackpot symbols to the one or more reels.

6. The gaming device of claim 3, wherein:
the display symbol positions of the display system comprise rows and columns of display symbol positions; and
the execution of the instructions causes the control system, in response to the modifier, to control the display system to present one or more additional rows of display symbol positions or one or more additional columns of display symbol positions.

7. The gaming device of claim 6, wherein the execution of the instructions causes the control system to control the display system to present wild symbols at the one or more additional rows of display symbol positions or at the one or more additional columns of display symbol positions.

8. The gaming device of claim 3, wherein:
the display symbol positions of the display system comprise a first matrix of display symbol positions; and
the execution of the instructions causes the control system, in response to the modifier, to control the display system to present a second matrix of display symbol positions.

9. The gaming device of claim 1, wherein:
the user interface system is configured to receive an indication of a wager amount; and
the execution of the instructions causes the control system, in response to the user interface system receiving the indication of the wager amount, control the display system to present a corresponding increase in a value of at least one configurable symbol.

10. The gaming device of claim 1, wherein:
the user interface system is configured to receive an indication of a wager amount; and
the execution of the instructions causes the control system, in response to the user interface system receiving the indication of the wager amount, to control the display system to provide an indication that at least one jackpot has become available.

11. The gaming device of claim 1, wherein the execution of the instructions causes the control system to control the display system to:
present the free game instances in a first display area of the display system; and
display the configurable symbols accumulated by the conclusion of the hold and spin stage in a second display area of the display system.

12. The gaming device of claim 1, further comprising apparatus for receiving monetary credit.

13. The gaming device of claim 1, wherein the execution of the instructions causes the control system to control the display system to present the free game stage after the hold and spin stage.

14. A gaming method, comprising:
controlling a display system of a gaming device with a controller of the gaming device to display corresponding display symbols of a first game outcome at display symbol positions of the display system;
in response to the first game outcome comprising a triggering number of configurable symbols, controlling the display system with the controller to present a hold and spin stage;
for each hold and spin instance of the hold and spin stage, controlling the display system with the controller to:
hold each displayed configurable symbol at its corresponding display symbol position; and
display replacement symbols for non-configurable symbols at display symbol positions not occupied by configurable symbols; and
controlling the display system with the controller to present a free game stage comprising a number of free game instances corresponding to a number of configurable symbols accumulated by conclusion of the hold and spin stage, wherein at least one of the configurable symbols accumulated by the conclusion of the hold and spin stage indicates a modifier for the free game stage.

15. The gaming method of claim 14, comprising, in response to the modifier, modifying one or more reels that are used during a free game instance of the free game stage.

16. The gaming method of claim 15, wherein modifying the one or more reels comprises at least one of adding one or more wild symbols to the one or more reels or adding one or more jackpot symbols to the one or more reels.

17. The gaming method of claim 14, wherein:
the display symbol positions comprise rows of display symbol positions; and
the gaming method comprises controlling the display system, in response to the modifier, to present one or more additional rows of display symbol positions.

18. The gaming method of claim 17, comprises controlling the display system to present wild symbols at the one or more additional rows of display symbol positions.

19. The gaming method of claim 14, wherein:
the display symbol positions of the display system comprise a first matrix of display symbol positions; and
in response to the modifier, controller the display system to present a second matrix of display symbol positions.

20. The gaming method of claim 14, wherein:
the display symbol positions comprise columns of display symbol positions; and
the gaming method comprises controlling the display system, in response to the modifier, to present one or more additional columns of display symbol positions.

* * * * *